United States Patent [19]

Melson

[11] 4,221,281

[45] Sep. 9, 1980

[54] CARRIER FOR REMOTE CONTROLLER

[76] Inventor: James L. Melson, 11365 Orcas Ave., Lake View Terrace, Calif. 91342

[21] Appl. No.: 957,865

[22] Filed: Nov. 6, 1978

[51] Int. Cl.² .......................................... H02G 11/00
[52] U.S. Cl. ................................................. 191/12 R
[58] Field of Search .................. 191/12 R, 12.2 R; 248/51, 52; 188/42, 67

[56] References Cited

U.S. PATENT DOCUMENTS

| | | | |
|---|---|---|---|
| 1,151,374 | 8/1915 | Moulton | 188/42 |
| 2,893,518 | 7/1959 | Vanderbeck | 188/42 |
| 3,548,122 | 12/1970 | Hay | 191/12 R |

*Primary Examiner*—Richard A. Schacher

[57] ABSTRACT

A carrier for an apparatus that must be moved to different positions relative to a work station includes a track mounted to the work station and a truck assembly with a locking brake riding the track. A mounting head which receives the apparatus is coupled to the truck by an arm. The mounting head rotates relative to the arm and includes a locking brake to prevent rotation. A single control handle simultaneously releases the mounting head and truck assembly to permit normal relocation and reorientation of the apparatus with respect to the work station and convenient access to the apparatus. Releasing the control handle causes both locking brakes to engage, thereby fixing the apparatus in the desired position and orientation.

9 Claims, 8 Drawing Figures

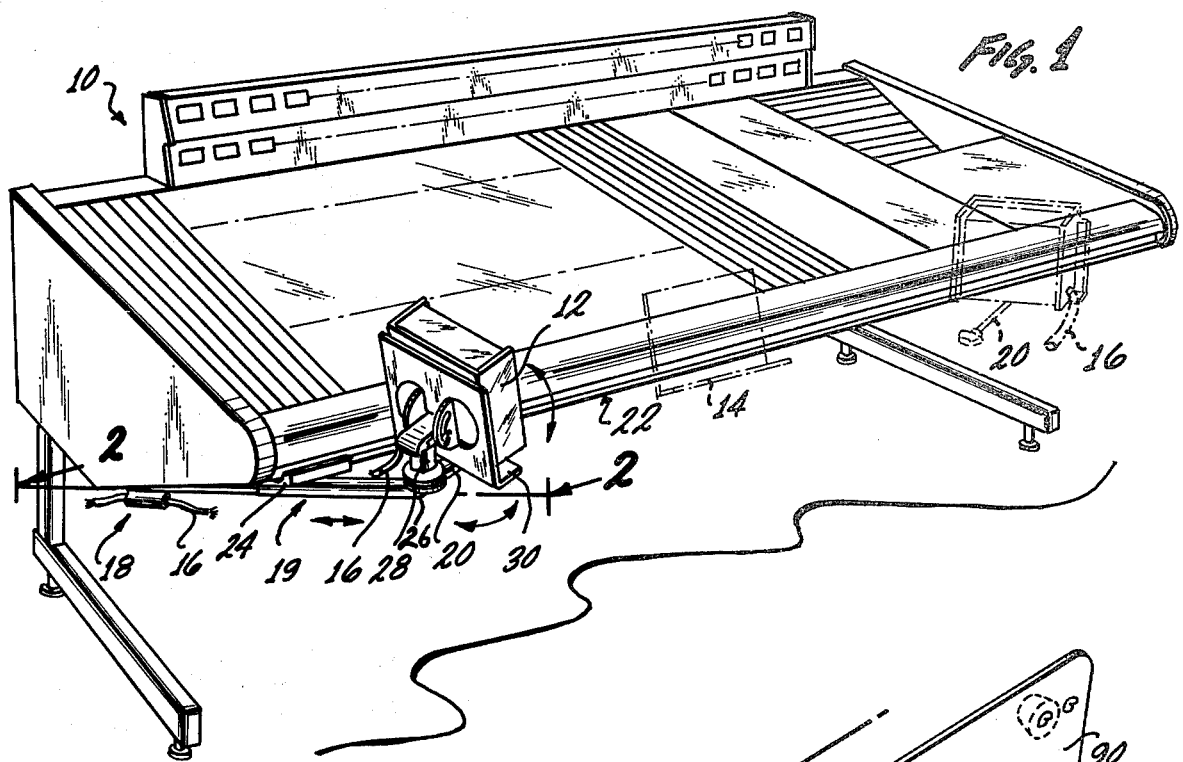
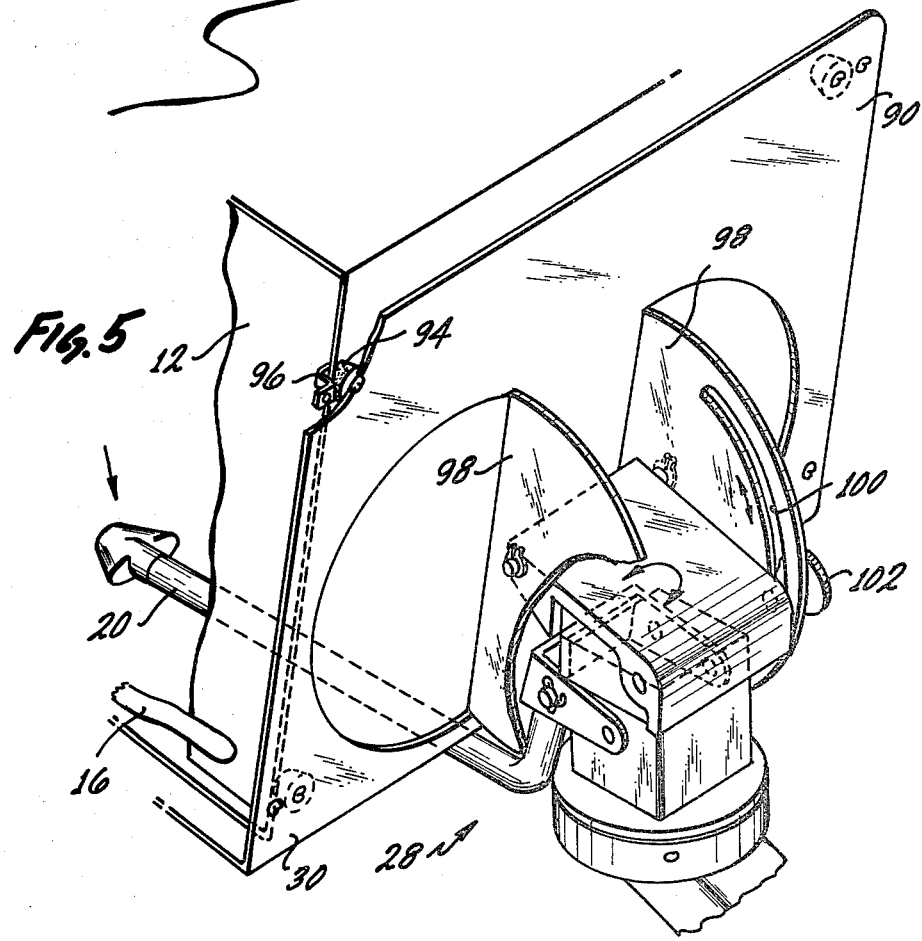

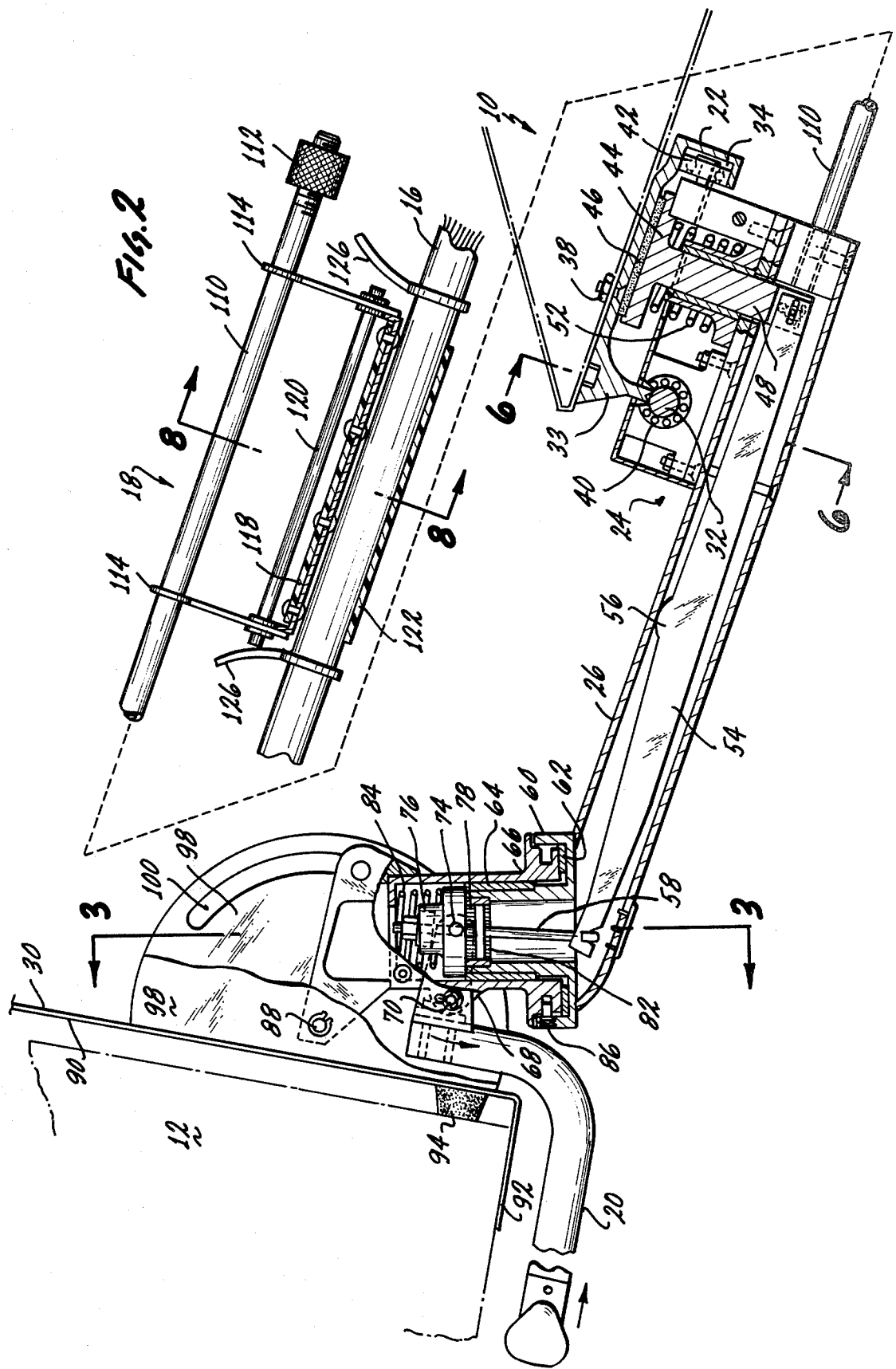

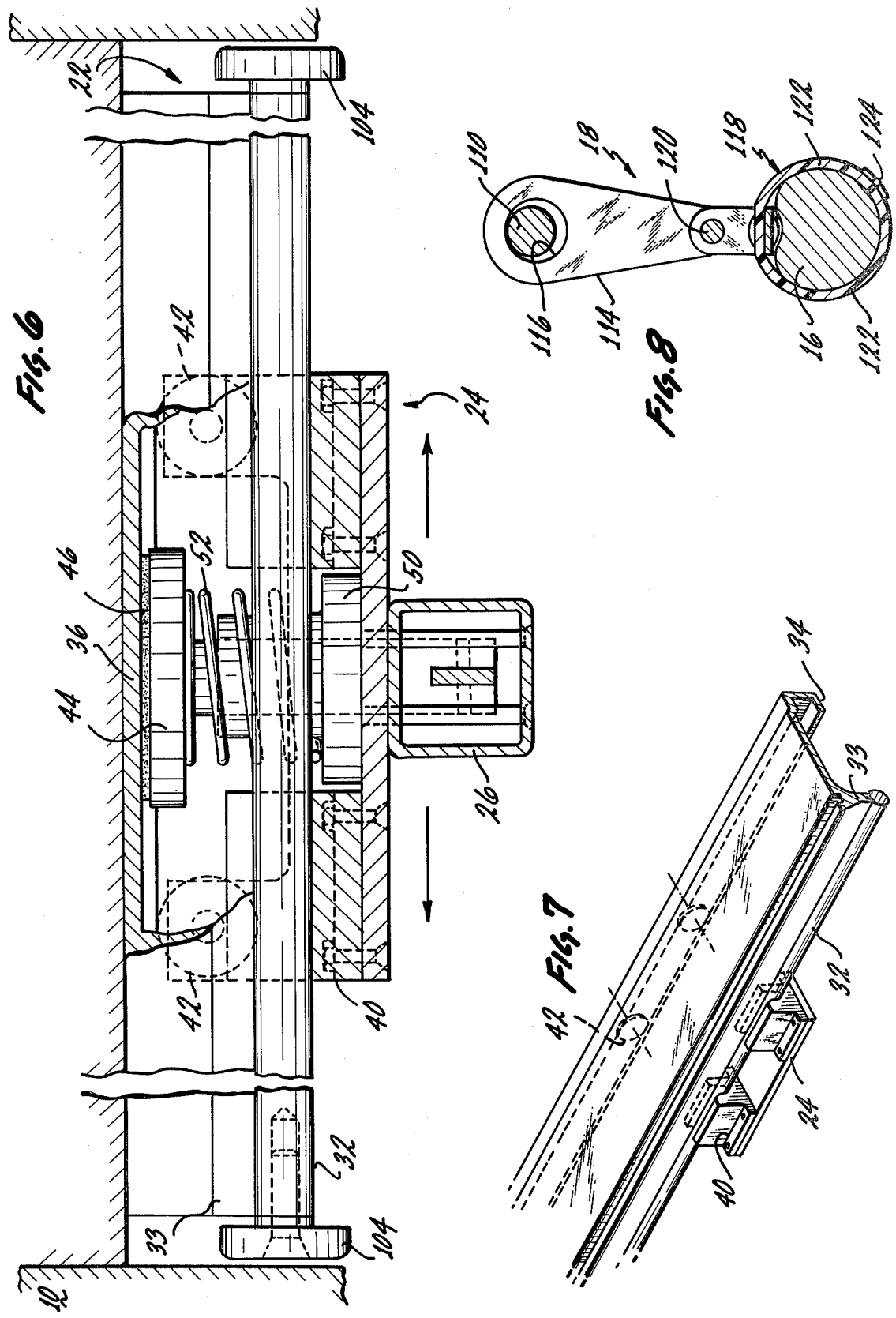

CARRIER FOR REMOTE CONTROLLER

BACKGROUND OF THE INVENTION

The present invention relates to carrier assemblies and more particularly to apparatus for holding an electrical controller unit which includes a trailing electric cable, and for easily repositioning the controller unit to a desired position at a work station.

When an individual performs tasks at a work station at which various apparatus is more or less permanently installed and which requires the use of ancillary and auxiliary equipment that must be placed in a position that is convenient to the operator, such auxiliary equipment or apparatus can be mounted on a carrier assembly of size and complexity that generally is a function of the size and weight of such apparatus. For example, a work light can easily be positioned at the end of an arm assembly with suitable linkages and biases so that the lamp can conveniently be positioned by the operator. Similarily, microphones and simple push button controllers can also be mounted on simple balanced linkage assemblies without great problems.

Where the apparatus that must be moved for the convenience of the operator is large and bulky, such as an oscilloscope, or where other complex and heavy equipment must be moved around the work station, a separate, wheeled cart can be provided which is sufficiently rugged to transport the apparatus. Some work stations, however, do not readily permit the use of carts and many ancillary apparatus are either too bulky or include substantial cables which make the use of an articulated arm mounted at a single location impractical.

There is a category of auxiliary apparatus which is designed to control the operation of electronic equipment and which is too small to require a cart and yet too large to be mounted on an articulated arm. Further, such controllers include trailing electrical cables which should be kept out of the way of the operator.

One typical control apparatus that does not lend itself readily to either a cart or an articulated arm is a multi-track tape recorder controller, which is sold as an accessory to a master tape recorder. The controller permits, at a remote location, a complete duplication of all controls that are otherwise located on the tape recorder console. A typical remote controller may be as small as one foot square and yet would have attached to it a substantial cable assembly which must attach to the recorder unit.

Such multi-track tape recorders are commonly utilized in recording studios. A work station at a recording studio is primarily a large console which includes the necessary controls for several input and output channels. Depending upon the number of channels to be controlled and the amount of free area desired, a typical console could range from six to eight feet in width, with the operator being required to shift positions at the console, depending upon which input channels are being utilized and must be controlled. Such a console may be considered a work station, necessitating some freedom of movement of the operator with respect to that station.

If a remote control unit is provided for the tape recorder, than it is important for the operator of the console to have the tape controls convenient to where he happens to be, relative to the console. Such a remote tape controller depends, for it utility, upon being accessible to the operator, no matter what his position at the console.

A separate cart carrying the remote control unit is not particularly convenient and has the problem of the trailing cable which must be accounted for. Certainly, an articulated arm is inadequate. While the problem addressed is directed to the needs of the console operator in a recording studio, it is clear that similar problems exist in other work stations when using other auxiliary and ancillary remote control units of complex electrical equipment.

According to the present invention, a carrier assembly is provided that operates on a track that can be mounted to the underside of the console in the recording studio. A truck assembly is mounted on the track and includes a normally actuated locking brake which holds the truck in any preselected position on the track. An arm extends from the truck and includes a mounting head that is capable of full rotation. The controller is mounted to the rotatable portion of the mounting head and a tilting mechanism permits a fixed adjustment of the controller relative to the axis of rotation.

The mounting head also includes a normally actuated, locking brake assembly that holds the controller in a desired orientation once the position has been selected. A single control lever, when pushed, simultaneously releases both locking brakes and permits the operator to relocate the entire assembly relative to the track and to reposition the controller and reorient it with respect to the rotational axis. Releasing the handle reengages both locking brakes.

A unique cable carrier assembly is mounted on an extension of the carrier arm and includes a pair of cable carriers which support and suspend the cable. The carriers are free to translate in the axial direction within limits on the arm and are also loosely mounted so that they may rotate around an extension of the arm.

The carrier assembly holds the cable with sufficient slack to permit repositioning and reorienting the controller without requiring an excessive amount of trailing cable, while holding the cable close to the console work surface and away from the legs of the operators seated at the console.

The truck assembly rides on a specially designed track that includes a forward, rail portion which is engaged by a recirculating ball bearing, low friction support member, while a guideway is provided at the rear of the track in which a roller bearing assembly, attached to the truck, bears on the guideway. A frictional brake is normally biased into engagement with the rail assembly so as to hold the truck against translational motion.

The rail portion of the track functions both as a support member and a fulcrum about which the truck assembly can rotate. The roller member which rides in a channel, is maintained in engagment with the channel by the rotational moment created by the weight of the controller at the end of the arm, rotating about the rail portion. If the controller has been removed, the guideway prevents reverse rotation of the truck about the rail portion.

The rotational head utilizes a splined member with a corresponding splined collar that is axially translatable with respect thereto. By displacing the splined post in the axial direction, the mounting head is free to rotate, while releasing the splined post returns it into engagement with the splined collar, thereby locking it against further rotation. Simple translational motions are therefore required to release and energize both brake systems. Therefore, the brake release function can be accomplished through a simple lever combination which can easily be operated with one hand.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of a recording console upon which the carrier assembly of the present invention has been installed;

FIG. 2 is a side sectional view of the carrier assembly of FIG. 1, taken along line 2—2 in the direction of the appended arrows;

FIG. 5 is a rear perspective view of the mounting head and control lever of the carrier assembly according to the present invention;

FIG. 6 is a sectional view of the truck assembly of FIG. 2, taken along the line 6—6 in the direction of the appended arrows;

FIG. 7 is a fragmentary and partially in phantom view of the relationship between the track assembly and the truck elements according to the present invention; and FIG. 8 is an end sectional view of the cable supporting apparatus of the carrier of FIG. 2, taken along the line 8—8 in the direction of the appended arrows.

DESCRIPTION OF THE PREFERRED EMBODIMENT

Figure 3:
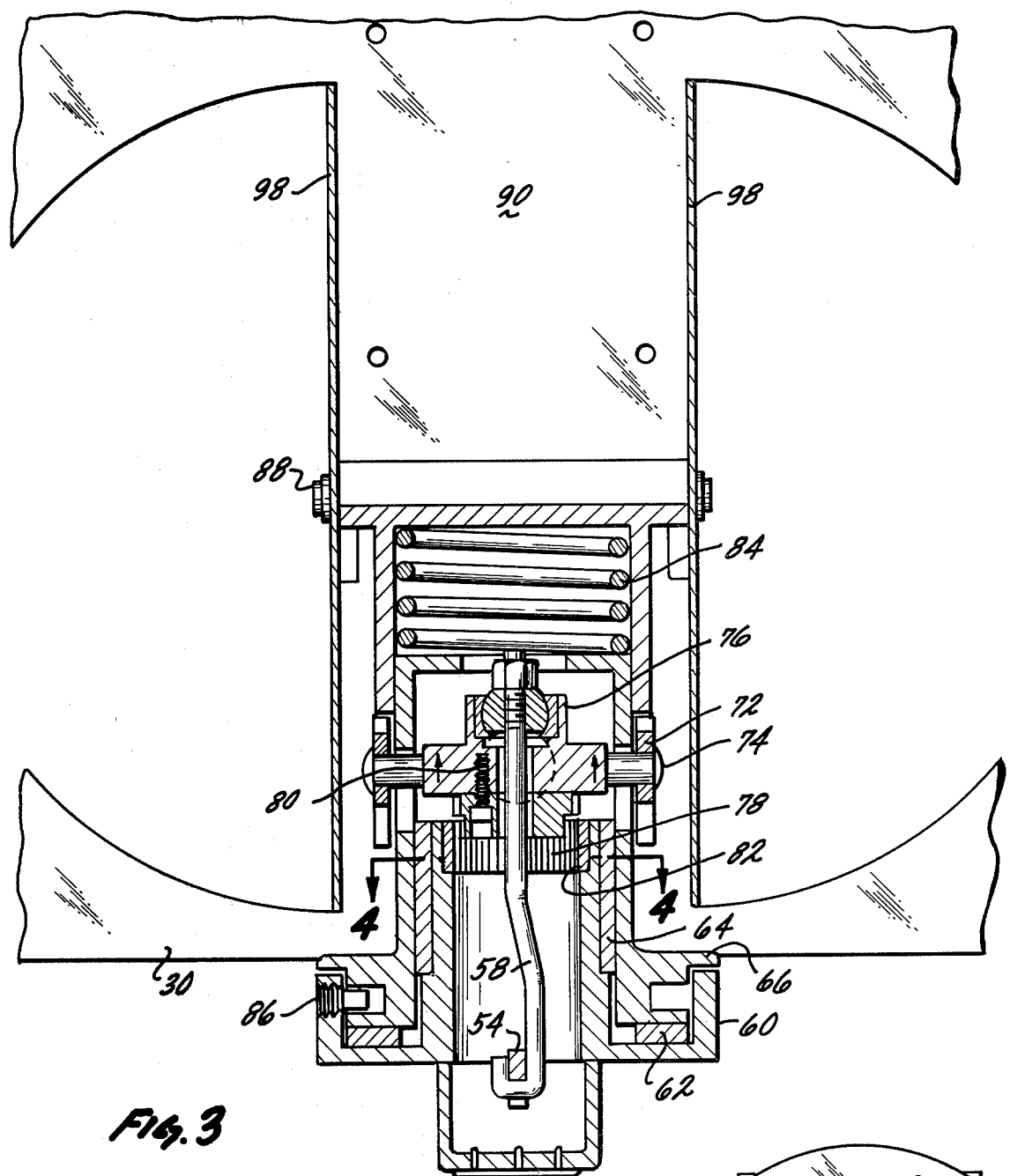
FIG. 3 is a sectional view of the mounting head portion of the carrier assembly of FIG. 2 taken along line 3—3 in the direction of the appended arrows.

Turning first to FIG. 1, there is shown an embodiment of the present invention attached to a work station. In the present example, the work station is a professional mixing console 10, typical of those installed in recording studios. As shown, the console 10 is a substantially rectangular table with various knobs, switches, sliders and other controls, which must be manipulated by an operator during the course of a recording session involving many electrical inputs and outputs.

When a multi-channel tape recorder (not shown) is utilized in the studio, and the controls for such a recorder have not been integrated into the console 10, it is necessary that a remote controller unit, which is connected to the tape recorder by a multi-strand electrical cable be provided to enable the operator to coordinate his various activities with a minimum of lost motion.

Consoles, such as the mixing console 10 of FIG. 1, can be of any length, depending, of course, upon the numbers of input and output functions that must be controlled. A typical unit, such as is shown in FIG. 1, may be seven feet or more in length. It is therefore necessary for an operator to move back and forth across the console, depending upon which controls he is operating during a recording session.

It is therefore desirable that the remote controller of the tape recorder be conveniently located for him. The controller should be positionable in virtually any location and in any orientation relative to the operator's position at the console 10.

As shown, a remote unit 12 is mounted on a carrier assembly 14 according to the present invention. A rather substantial cable 16, leading from the remote control unit 12, is held by a cable support assembly 18 that is a portion of the carrier assembly 14, which keeps the cable from interfering with the feet of the operator.

In FIG. 1, the carrier assembly 14 and the remote control unit 12 carried thereby are shown in a first location at the left side of the console and, in phantom at the center and at the right side of the console 10. The carrier assembly 14 includes a control handle 20 which is manually operable to reposition and reorient the remote control unit 12 for the convenience of the operator at the work station.

The carrier assembly 14, as shown in FIG. 1, includes a track assembly 22, a truck assembly 24, an arm assembly 26, a mounting head 28, and a stand portion 30 for holding the remote control unit 12.

The elements of the carrier assembly, are best seen in connection with FIG. 2 in which they are disclosed in greater detail. The track portion 22 includes a rail portion 32, which is a separate, cylindrical rod of case hardened steel that is attached to a pedestal portion 33, positioned to be close to the edge of the console 10 upon which the assembly is mounted. At the opposite edge of the track portion 22 is a guideway portion 34 which is in the shape of a channel. Intermediate the rail portion 32 and the guideway portion 34, is a substantially flat, brake portion 36 which is adapted to frictionally engage the truck portion 24.

As shown in FIG. 2, a screw and nut fastener 38 is countersunk to fasten the track portion 22 to the underside of the console 10 and, as shown, the fasteners are generally positioned in a line through the brake portion 36 of the track. In a preferred embodiment, the track 22 including the pedestal 33 and the guideway portion 34 can be an integral extrusion to which is attached the steel rail portion 32.

The truck assembly 24, as seen in FIGS. 2, 6 and 7, includes a pair of recirculating ball bearing pillow block members 40 that are adapted to ride on the rail portion 32. A preferred pillow block is commercially available from Thompson Industries, Inc. of Manhasset, NY under the trademark "Super Ball Bushing" pillow blocks. The truck assembly 24 also includes a pair of roller elements 42 that are adapted to ride in the guideway portion 34 of the track 22.

Between the linear bearing contact of the pillow block 40 and the rail portion 32, and the rolling contact of the roller element 42 in the guideway portion 34, the truck 24 is free to move linearly, parallel to the front of the console 10. Through the use of such low friction, rolling elements, the truck 24 can easily be moved back and forth with little effort regardless of the position of the handle 20.

In order to hold the truck 24 in a fixed location so as to permit use of the remote control unit 12 which is carried by the carrier assembly 14, a locking brake mechanism 44 is provided which includes a friction pad 46 that bears on the braking portion 36 of the track 22.

The pad 46 is attached to a truck brake 48 which rides in a brake guide 50. A bias spring 52 fits over the brake guide 50 and is supported between the brake guide 50 and the brake 48 to normally bias the brake 48 into locking engagement with the brake portion 36 of the track 22.

A substantially hollow arm 26 couples the truck assembly 24 to the mounting head 28. Within that hollow, there is mounted a brake lever 54, which includes a central fulcrum portion 56. Motion at one end of the lever 54 is converted into motion in the opposite direction at the other end. The one end of the brake lever 54 is coupled to the truck brake 48 and the other end is coupled to a brake yoke 58, which is connected to the mounting head 28.

As shown in FIGS. 2 and 6, upward vertical motion of the yoke 58 becomes downward motion of the brake 48 thereby disengaging the brake pad 46 from the brake portion 36 of the track 22 thereby releasing the truck 24 for linear motion. Similarly, downward motion of the yoke 58 releases the brake 48 which, under the urging of the bias spring 52, sends the brake pad 46 into locking engagement with the brake portion 36 of the track 22.

The mounting head 28, as seen in FIGS. 2 and 3, is attached to the arm 26 with a body post 60. The body post includes a channel in which is placed a washer 62 of a bushing material such as bronze or teflon, as a sliding surface. A vertical portion of the body post 60 carries a second bushing 64 of a like material.

A body member 66 then rests on the washer 62 and bushing 64 and is rotatable about the body post 60. The mounting head body 66 includes a handle yoke portion 68 which carries a handle pin 70 to connect the operating handle 20 with the mounting head body 66. An elongated slot (not shown) permits a pair of brake operating pins 74 to connect the handle 20 to a universal head 76.

A brake post 78 is fastened to the universal head 76 with a plurality of fasteners 80. The brake post 78 is serrated with a plurality of equally spaced teeth and is adapted to mesh with a matching brake ring 82. The brake ring 82 is fixed to the body post 60 and is irrotational with respect thereto. The brake post is axially movable with respect to the brake ring 82.

In operation, when the handle 20 is depressed, the brake post 78 is elevated out of engagement with the brake ring 82, leaving the universal head 76 free to rotate relative to the body post 60. The universal head 76 permits the body 66 to rotate about the brake yoke 58 so that any rotational orientation may be selected.

When the control handle 20 is released, a relatively strong brake bias spring 84 urges the universal head 76 and the brake post 78 downward into engagement with the brake ring 82, thereby locking the mounting head 28 against further rotational motion. One or more locking screws 86 are installed in the body post 60 to hold the body member 66 in place against translational motion in the axial direction.

Figure 4:
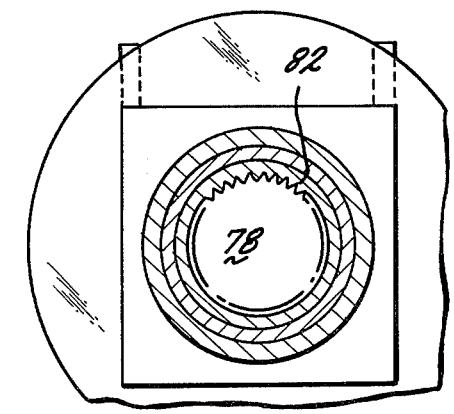
FIG. 4 is a top sectional view of the mounting head of FIG. 3, taken along the line 4—4 in the direction of the appended arrows.

In FIG. 4, the interrelationship between the brake ring 82 and the brake post 78 is shown. The brake post 78 may be considered as a section of a splined shaft and the brake ring 82 is a splined collar. This arrangement permits a positive locking relationship within the mounting head and yet relative rotation in very small incremental amounts can be achieved.

In FIG. 5, there is a perspective view of the mounting head 28 showing, in better detail, the attachment of the stand portion 30 and the control handle 20. FIGS. 2 and 3 are also useful in illustrating this relationship. As seen in several FIGS. the stand portion 30 includes a back plate 90 and a supporting lip 92 upon which the remote control unit 12 may rest. A plurality of resilient bumpers 94, together with clip fasteners 96 hold the control unit 12 in the stand 30, with spacing behind the control unit 12 for circulation of air.

The back plate 90 has a pair of D-shaped segments 98 which are cut out and folded back to accommodate the hardware that mounts the stand 30 to the mounting head 28. An arcuate cutout 100 in the D-shaped wings 98 permits a tilting adjustment to be made of the stand 30. A locking knob 102 frictionally holds the stand 30 at the desired tilt angle.

Turning next to the FIGS. 6 and 7, the relationship of the truck assembly 24 is somewhat better illustrated than in FIG. 2. Since the track 22 can be extruded to any desired length, after the truck assembly 24 is installed, a pair of bumpers 104 are secured to the ends of the rail portion 32, to both cushion the truck 24 at the ends of travel and to prevent the truck 24 from colliding with the edges of the console 10 or, in the alternative, leaving the track 22.

Finally, turning to FIGS. 2 and 8, there is shown the cable support 18 which permits the trailing cable to be transported by the carrier assembly 14 of the present invention, without tangling and without getting under foot. As seen in FIG. 2, a cable carrier rod 110 extends from the arm 26 and is terminated with a locking nut 112. A pair of cable carrier swing arms 114 are loosely mounted on the rod 110 through an oversized aperture 116. A cable holder element 118 is pivotally mounted to the cable carrier swing arm 114 by a cable holder pin 120, about which the cable holder 118 may rotate.

The cable holder 118 includes a pair of semi-cylinders 122, which may be as simple as a segment of plastic pipe of suitable diameter which has been cut in half. The semi-cylinders 122 are fastened to the cable holder 118 and the halves may be kept together either by an appropriate hinging mechanism 124 or through the use of simple cable ties 126, two of which are shown about the cable 16 in FIG. 2. The cable ties 126 limit the axial travel of the cable 16 through the cable holder 118.

It will be seen that with the rotational mounting available at the cable holder pin 120 and the loose sliding fit of the cable carrier swing arm 114 on the cable carrier rod 110, the cable is free to move both axially with respect to the rod 110 and the carrier 118, as well as rotationally in virtually any plane.

In summary, the carrier assembly of the present invention transports a controller unit which has a trailing cable. Through a combination of a track assembly permitting lateral movement with respect to the work station as well as a rotating mounting head, an operator may press the operating control handle and, with one hand operation, can both translate and rotate the control unit to any convenient location and orientation at the work station. The controller unit itself is positioned on a stand that can be tilted for optimum access by the operator. The entire assembly is normally locked in place when the control handle is released.

A novel cable support assembly carries the trailing cable above the floor and out of the way and permits the cable to easily follow the control unit without twisting or dragging. A frictional brake holds the truck against lateral movement with respect to the track, and a splined brake post cooperating with a splined brake ring locks the mounting head against undesired rotation.

Thus, there has been shown a novel carrier assembly that is easily affixed to a work station for permitting a controller unit to be placed in any desired orientation with respect to the work station through simple one-handed operation and which will automatically lock the unit in the desired orientation. Other modifications and variations will appear to those skilled in the art and accordingly, the scope of the invention should be limited only by the claims appended hereto.

What is claimed as new is:

1. In combination with a portable electrical controller unit having a cable assembly connected to a remote apparatus to be controlled, a carrier assembly coupled to a work station for enabling one hand transporting and positioning of the controller unit relative to the work station, said carrier assembly comprising:
    (a) track means adapted to be fixedly connected to the work station to define the extent of travel of the carrier assembly;
    (b) a truck assembly including a track means engaging portion and first locking means for normally locking said truck assembly in locking engagement to prevent motion relative to said track means;
    (c) an arm member connected to said truck assembly;
    (d) a mounting head connected to said arm member and adapted to receive the controller unit, said mounting head including means enabling relative rotation between the controller unit and said arm member and second locking means for normally making locking engagment to prevent such relative rotation; and
    (e) a control lever connected to said mounting head for positioning said mounting head mechanically linked to said first and second locking means and manually operable for substantially simultaneously operating said first and second locking means out of locking engagment;
    whereby one handed operation of said control lever releases said first and second locking means and enables an operator to move the controller unit to a desired location and orientation relative to the work station after which the operator can permit locking engagement of said first and second locking means to prevent subsequent motion of the controller unit.

2. The apparatus of claim 1 wherein said track means include a rail portion, and a guideway portion and a surface adapted to cooperate with said first locking means for locking the carrier assembly against translational motion relative to said track means.

3. The apparatus of claim 1 wherein said first and second locking means are normally biased into locking engagement, and whereby actuation of said control lever disengages said first and second locking means against the normal bias.

4. The apparatus of claim 1 wherein said first locking means include a frictional brake element engaging said track means surface.

5. The apparatus of claim 1 wherein said second locking means include a splined shaft and a splined hub and translating means, coupled to said control lever for moving one of said shaft and hub out of engagement with the other of said shaft and hub to permit relative rotation therebetween.

6. The apparatus of claim 2 wherein said truck assembly includes recirculating ball bearings in rolling contact with said rail portion and rollers in engagement with said guideway portion of said track means.

7. The apparatus of claim 1 wherein said control lever linkage to said second locking means includes a yoke and lever whereby said first and second locking means are simultaneously released by actuation of said control lever.

8. The apparatus of claim 1 wherein the mechanical linkage to first locking means traverses through said arm member, and the linkage to said second locking means traverses through said mounting head.

9. The apparatus of claim 1 further including a cable carrying assembly adapted to support the control cable interconnecting the controller and the apparatus being controlled, the cable carrying assembly comprising:
    (a) a rod member connected to said truck assembly and extending away from said arm member;
    (b) at least a pair of axially spaced hanger members loosely mounted on said rod member and freely movable with respect thereto in axial and rotational direction; and
    (c) cable support means adapted to receive the cable connected to said hanger members and rotatable with respect thereto,
    whereby a supported cable can move laterally and rotationally with respect to said rod member.

* * * * *